United States Patent [19]

Yoshioka et al.

[11] Patent Number: 5,248,015
[45] Date of Patent: Sep. 28, 1993

[54] AUTOMOBILE SUSPENSION

[75] Inventors: Tohru Yoshioka; Tetsuro Butsuen; Yasunori Yamamoto, all of Hiroshima, Japan

[73] Assignee: Mazda Motor Corporation, Hiroshima, Japan

[21] Appl. No.: 987,178

[22] Filed: Dec. 8, 1992

[30] Foreign Application Priority Data

Dec. 9, 1991 [JP] Japan .................. 3-324188
Dec. 9, 1991 [JP] Japan .................. 3-324189

[51] Int. Cl.⁵ .......................... F16F 9/46; B60G 11/26
[52] U.S. Cl. .................................. 188/299; 280/707
[58] Field of Search ............ 188/299, 319, 322.15, 188/322.22, 316–318; 280/707; 364/424.05

[56] References Cited

U.S. PATENT DOCUMENTS 5,143,186 9/1992 Lizell .......................... 188/299

FOREIGN PATENT DOCUMENTS 60-248419 12/1985 Japan .
63-40213 3/1988 Japan .

Primary Examiner—Douglas C. Butler
Attorney, Agent, or Firm—Sixbey, Friedman, Leedom & Ferguson

[57] ABSTRACT

Disposed between a sprung element and an unsprung element is a shock absorber of multi-degree variable-damping-coefficient type. A damping coefficient of the shock absorber is changed so that an actual damping force generated by the shock absorber becomes equal to a target damping force that causes no sprung vertical motion. Such a change is inhibited when the difference between the damping force and the target force falls in the range of a predetermined value. The value is changed according to the magnitude of an damping coefficient now in selection of the shock absorber. This allows the shock absorber to effectively produce damping forces while at the same time preventing the damping coefficient from being changed too often to avoid the occurrence of chattering. Additionally, control delay due to the presence of a dead band zone is lessened. Traveling stabilization and riding comfort is improved.

10 Claims, 13 Drawing Sheets

F I G.13
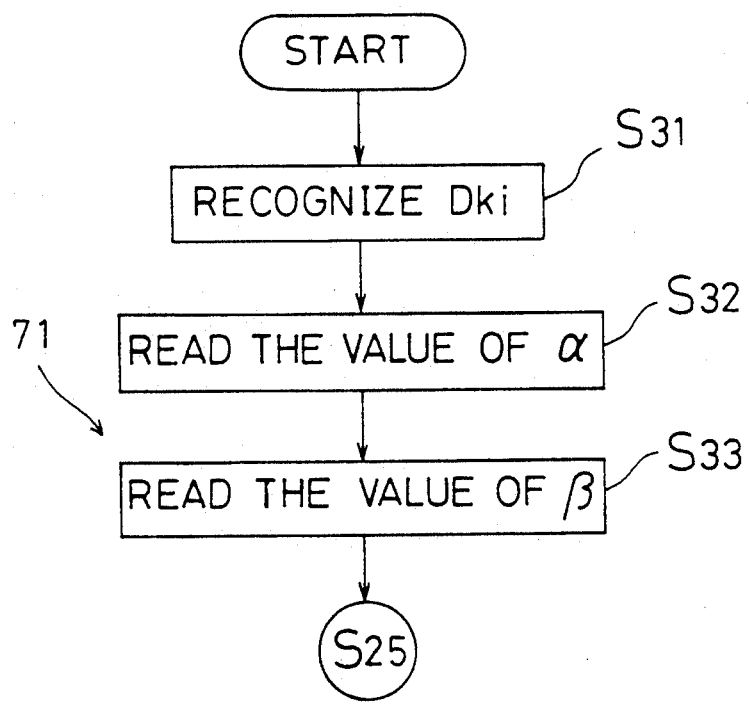

AUTOMOBILE SUSPENSION

BACKGROUND OF THE INVENTION

This invention generally relates to automobile suspension systems. More particularly, it pertains to an improved automobile suspension system with a shock absorber of multi-degree variable-damping-coefficient type between a sprung element and an unsprung element.

An automobile suspension system generally includes between a body (i.e., the sprung element) and wheels (i.e., the unsprung elements) shock absorbers to damp up-and-down vibration of the wheels. Many types of shock absorbers are known in the art. For example, there is known a shock absorber of bi-degree variable-damping-coefficient type so that the damping coefficient can vary from a greater degree to a lesser degree, and vice versa. A shock absorber of multi-degree or infinitely variable-damping-coefficient type is likewise known.

The basic operation principles of such a shock absorber are that its damping coefficient is changed and controlled so as to harmonize an actual damping force, generated by the shock absorber, with a target damping force (i.e., the skyhook damper force) that causes no sprung vertical motion. Japanese Patent Application Laying Open Gazette No. 60-248419 discloses a shock absorber control method which checks for the agreement between a sign of the relative displacement between the sprung element and the unsprung element and another sign of the differentiated value thereof, (i.e., the relative velocity between the sprung element and the unsprung element). At the time when these two signs agree with each other, the damping coefficient of the shock absorber increases, which results in the increase of the damping force generated by the shock absorber. On the other hand, at the time when the two signs disagree with each other, the damping coefficient of the shock absorber decreases, which results in the decrease of the damping force generated by the shock absorber.

Such a control method described above employs a well known technique that a dead band zone is provided so as to prevent the damping coefficient of the shock absorber from being changed many times against displacement taking place in the vicinity of a neutral position. An example of this is disclosed in Japanese Utility Model Application Laying Open Gazette No. 63-40213. In accordance with this prior art technique, a dead band zone is provided with respect to the relative displacement between the sprung element and the unsprung element in controlling and changing the damping coefficient based on the foregoing agreement or disagreement diagnosis between the two signs. The damping coefficient of the shock absorber always keeps remaining at a lesser degree within the dead band zone. Further, the width of the dead band zone gets narrow when sprung element input such as a steering angle and a steering angle velocity is great so that rolling motion of the automobile can be controlled.

Generally, individual damping coefficients of different degrees, regardless of their magnitude, can be considered to have the same dead band zone in view of facilitating controlling.

This, however, presents the following drawbacks. That is, the decrease of the damping coefficient causes the absolute value of the damping force to decrease so that the change of the damping coefficient is carried out more than necessary even against the input of low external forces, when the damping coefficient is of a lesser degree. This results in the occurrence of chattering. Besides, when a rapid, severe external force works on the automobile, such as when traveling over a bump on the road surface, the change to a lesser degree damping coefficient to cope with such an external force is delayed due to the presence of the dead band zone. This results in the lack of damping force.

SUMMARY OF THE INVENTION

In accordance with the present invention, the dead band zone is appropriately changed depending upon the magnitude of damping coefficient so that damping force is effectively generated, and that the occurrence of chattering is prevented by preventing the damping coefficient from being changed many times, and superior traveling stabilization and riding comfort is accomplished by lessening control delay due to the presence of the dead band zone.

The suspension system of the invention includes a shock absorber of multi-degree variable-damping-coefficient type, a damping force detection means, a control means, an inhibition means, and a threshold change means. The shock absorber is disposed between a sprung element and an unsprung element. The damping force detection means detects an actual damping force generated by the shock absorber. The control means is supplied with a signal from the damping force detection means to change and control the damping coefficient of the shock absorber thereby harmonizing the foregoing actual damping force with a target damping force that does not cause the sprung element to move up and down. The inhibition means inhibits the control means from changing and controlling the damping coefficient of the shock absorber, when the difference between the actual damping force and the target damping force falls in the range of a predetermined value. This prevents the damping coefficient of the shock absorber from being changed too often. Additionally, the threshold change means changes the predetermined value according to the magnitude of the damping coefficient that is currently being selected from the range of selection.

As the damping coefficient now in selection increases, the foregoing predetermined value decreases (that is, the width of the dead band zone narrows). This condition facilitates the change of the damping coefficient to a greater degree. In view of this, a rapid, severe external force can be dealt with effectively, since the smooth change to a greater degree can be done without adverse effects due to the presence of the dead band zone. Thus, sufficient damping forces are available. This leads to better traveling stabilization and riding comfort. Conversely, as the damping coefficient now in selection decreases, the foregoing predetermined value increases, in other words, the width of the dead band zone extends. This condition hampers the change of the damping coefficient to a lesser degree thereby preventing the damping coefficient from being changed more than necessary against the input of low external forces. Thus, the occurrence of chattering can be avoided.

BRIEF DESCRIPTION OF THE DRAWINGS

Other objects, features, and advantages of the invention will become apparent from the following description of an embodiment by reference to the accompanying drawings in which:

FIG. 13 is a part of a flowchart showing in a modified example basic routines of the change control of the damping coefficient;

DESCRIPTION OF THE PREFERRED EMBODIMENT

Figure 1:
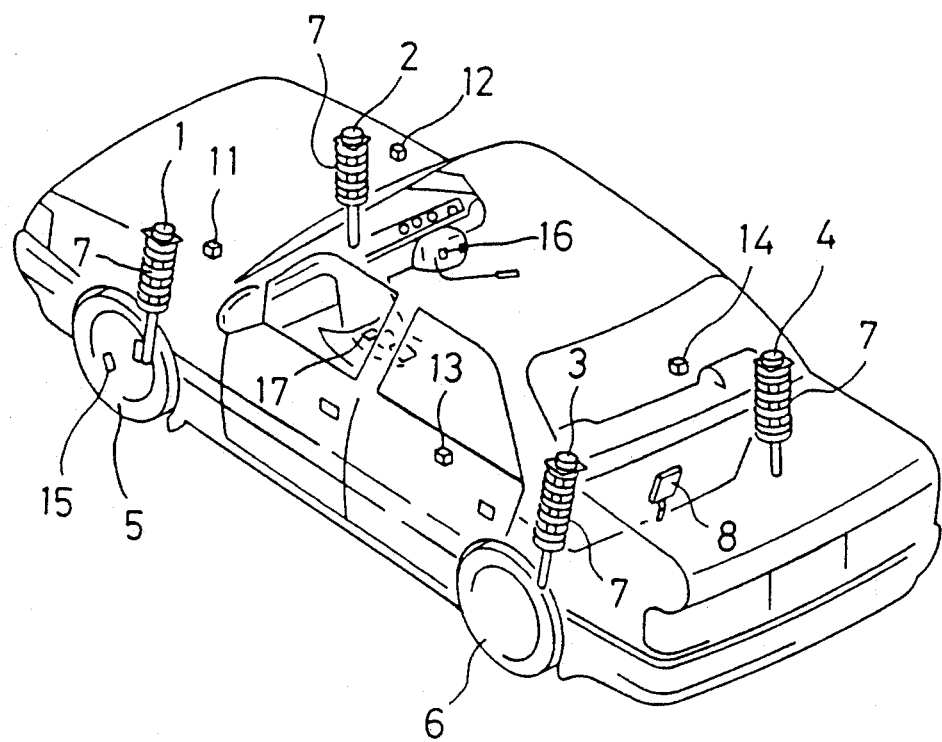
FIG. 1 is a perspective view illustrating a suspension system along with the layout of its components of the present invention.

The present invention is now described below by reference to the accompanying drawings. Shown in FIG. 1 is the layout of components of a suspension system of an embodiment of the invention. The suspension system, shown in FIG. 1, includes four shock absorbers 1, 2, 3, and 4, for four wheels (only LF (left front) and LR (left rear) wheels 5 and 6, however, are shown here), to damp spring oscillation due to up-and-down motion of the wheels. Each one of the shock absorbers 1, 2, 3, and 4 incorporates an actuator (see FIGS. 2 and 3) so that the damping coefficient is available at ten different degrees, and a pressure sensor (not shown) used to detect the magnitude of the actual damping force. Coil springs, indicated by the reference numeral 7, are arranged around the upper outer surfaces of the shock absorbers 1, 2, 3, and 4. A control unit is indicated by the reference numeral 8, which receives detection signals from the pressure sensors and sends out control signals to the actuators to change and control the damping coefficients of the actuators.

Four acceleration sensors are indicated by the reference numerals 11, 12, 13, and 14, respectively, each detecting the sprung vertical acceleration per wheel. A speed sensor 15 serves as a traveling speed detection means, which detects traveling speed, based on the rotational speed of the LF wheel 5 of a driven wheel. A steering angle sensor 16 detects the steering angle of the LF wheel 5, based on the revolution of a steering shaft. A driver-operated mode selector 17 is used to select a desired mode from among HIGH MODE, SOFT MODE, and CONTROL MODE with respect to the damping coefficients of the shock absorbers 1, 2, 3, and 4. More specifically, if the driver selects HIGH MODE, this means that a greater degree damping coefficient is selected to generate a harder damping force. If SOFT MODE is selected, on the other hand, this means that a lesser degree damping coefficient is selected to generate a softer damping force. CONTROL MODE allows the control unit 8 to change and control the damping coefficients of the shock absorbers 1, 2, 3, and 4 either by means of a map or by means of a table stored in advance in the control unit 8. This change control is detailed later.

Figure 2:
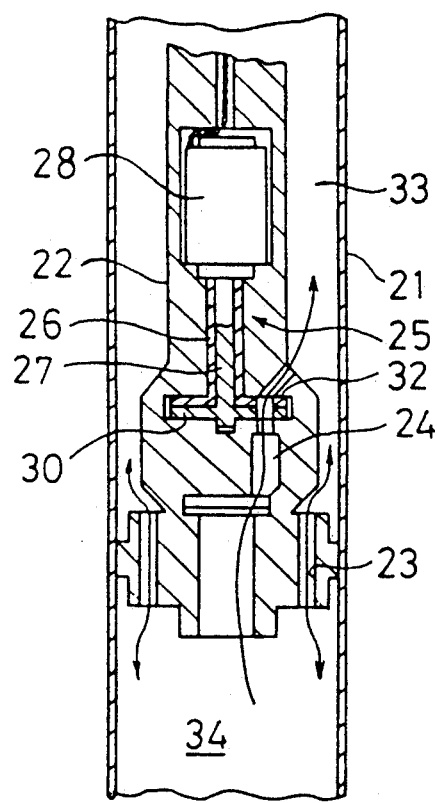
FIG. 2 shows in vertical section the main section of a shock absorber of the suspension system of the invention.

With reference to FIG. 2, the organization of the shock absorbers 1, 2, 3, and 4 is now illustrated. Note that the pressure sensors, incorporated into each shock absorber, are not shown here for the sake of simplicity. A cylinder is indicated by the reference numeral 21. A piston and a piston rod are machined integrally to form a piston unit 22. The piston unit 22 is so fitted into the cylinder 21 that it can slide through the cylinder 21. The cylinder 21 is connected to the unsprung element by way of one connection structure and the piston unit 22, on the other hand, is connected to the sprung element by way of the other.

Figure 3:
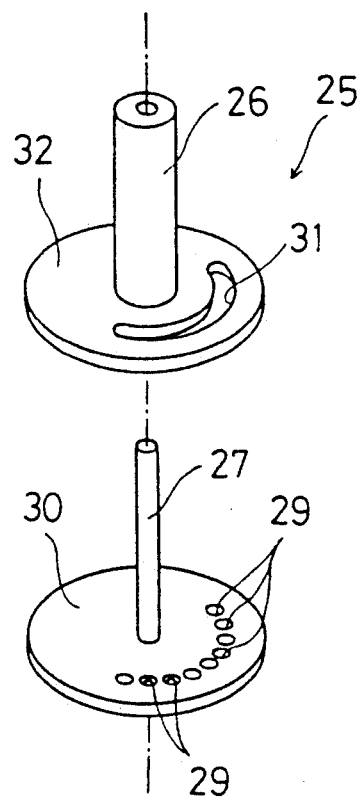
FIG. 3 is an exploded perspective view showing an actuator of the shock absorber of the suspension system of the invention.

The piston unit 22 has two portions defining two orifices 23 and 24. Of these orifices, the orifice 23 is so designed that it keeps opening at all times, while on the other hand the orifice 24 is so designed that it can throttle flow at ten different degrees of opening by means of the actuator 25. The actuator 25, as shown in FIG. 3, includes a sleeve 26, arranged in the piston unit 22 in a stationary manner; a shaft 27 that extends through the sleeve 26 in a rotatable manner; a step motor 28 (not shown in FIG. 3 but in FIG. 2) that rotates the shaft 27 a predetermined angle at a time; a first orifice plate 30 that is connected to the lower end of the shaft 27 to rotate together with the shaft 27 and has portions defining nine circular openings 29 in a circumferential direction at predetermined intervals; and a second orifice plate 32 that is attached to the lower end of the sleeve 26 and has a portion defining a crescent-like opening 31 in a circumferential direction. The operation of the step motor 28, which results in the revolution of the first orifice plate 30, causes the relative positions of the circular openings 29 to the crescent-like opening 31 to change. In other words, at one position, the openings 29 and the opening 31 face with each other, and at the other they do not. Further, the number of the openings 29 facing the opening 31 sequentially changes from zero to nine.

Upper and lower chambers 33 and 34 within the cylinder 21, and a hollow within the cylinder 21 that communicates with both two chambers 33 and 34 are all filled with fluid having an appropriate viscosity. Such fluid travels between the upper chamber 33 and the lower chamber 34 either through the orifice 23 or through the orifice 24.

Figure 4:
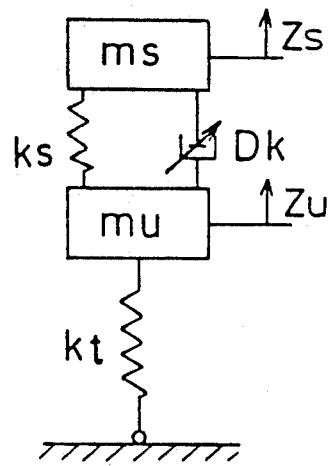
FIG. 4 is an oscillation model diagram of the suspension system of the invention.

FIG. 4 illustrates an oscillation model of the suspension system of the invention where ms is the sprung mass, mu is the unsprung mass, zs is the sprung displacement, zu is the unsprung displacement, ks is the spring rate of the coil spring 7, kt is the spring rate of the tire, and Dk is the damping coefficient of the shock absorbers 1, 2, 3, and 4.

Figure 5:
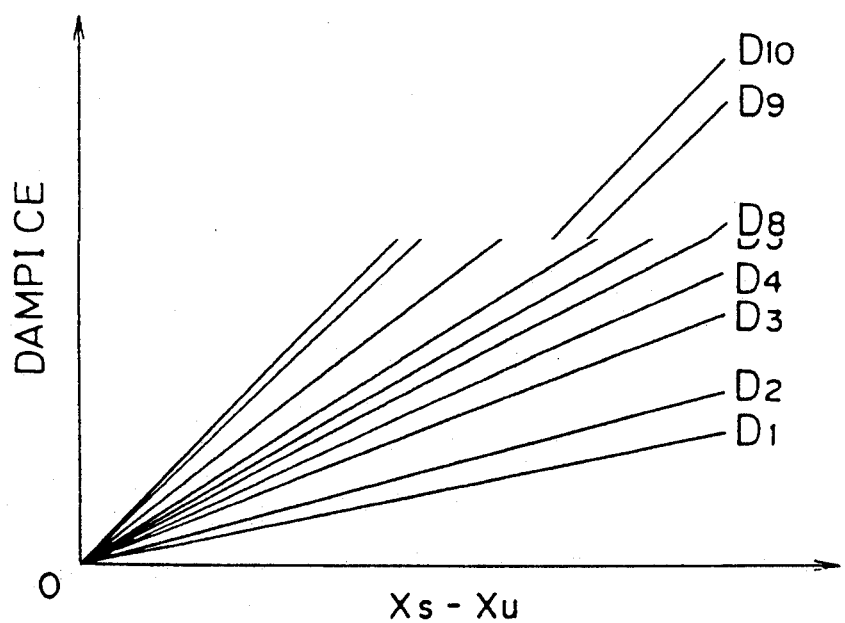
FIG. 5 shows the damping coefficient of the shock absorber of the invention.

FIG. 5 is a graph showing the damping coefficients D1 through D10 of the shock absorbers 1, 2, 3, and 4. The ordinate indicates the damping force generated by the shock absorbers 1, 2, 3, and 4, while the abscissa indicates the difference between the sprung displacement velocity, Xs (dzs/dt) and the unsprung displacement velocity, Xu (dzu/dt) (i.e., the relative displacement velocity between the sprung element and the unsprung element (Xs-Xu)). The damping coefficients D1 through D10 of ten degrees are available for the shock absorbers 1, 2, 3, and 4. Of these damping coefficients, the damping coefficient D1 is a damping coefficient that generates a softest damping force, whereas the damping coefficient D10 is a damping coefficient that generates a hardest damping force. Here, the damping coefficient Dk, where the letter "k" changes from one to ten and represents the degree of the damping coefficient, is selected according to the number of the circular openings 29 communicating with the crescent-like opening 31 (i.e., (10−k)). The damping coefficient D1, therefore, is selected when all of the nine circular openings 29 of the first orifice plate 30 communicate with the crescent-like opening 31 of the second orifice plate 32. The damping coefficient D10 meanwhile is selected when none of the openings 29 communicate with the crescent-like opening 31.

Figure 6:
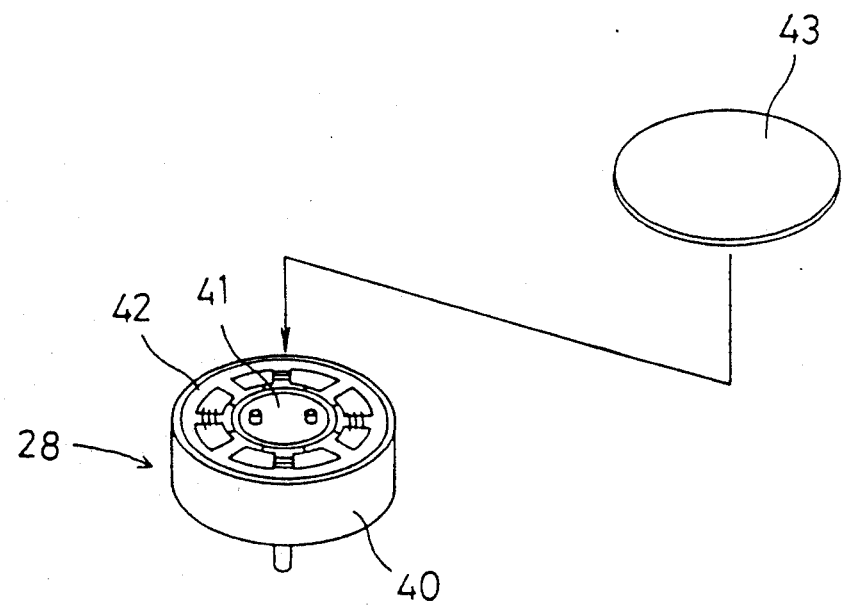
FIG. 6 is a perspective view of a step motor built in the foregoing shock absorber.
Figure 7:
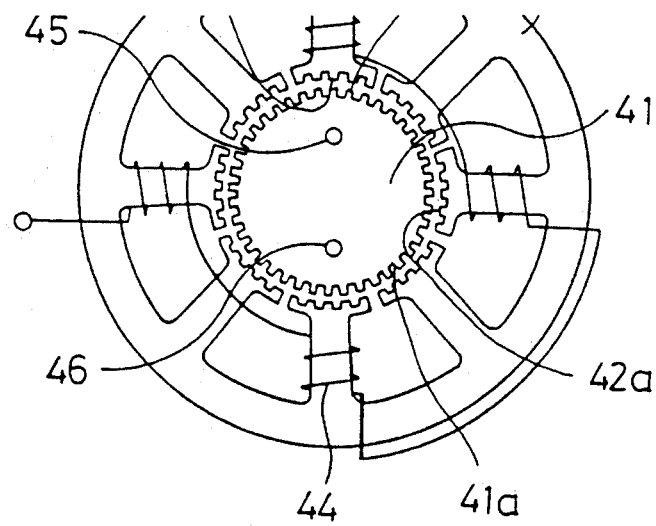
FIG. 7 is a plan view showing a rotor and a stator of the step motor of FIG. 6.
Figure 8:
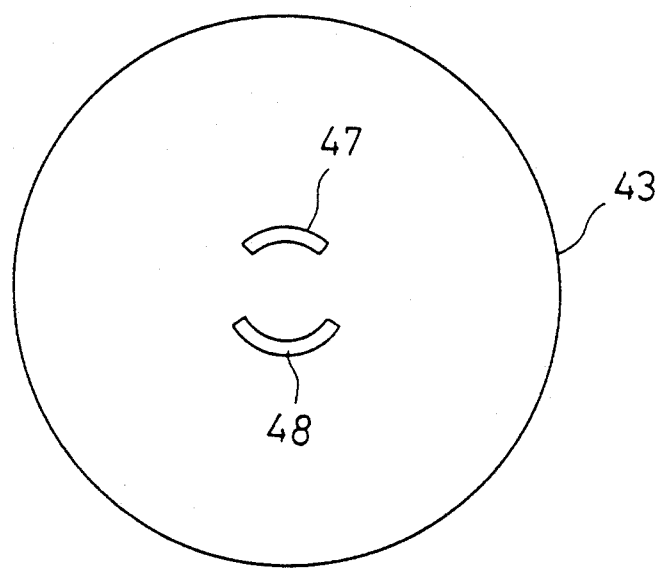
FIG. 8 is a bottom plan view of a cover of the step motor of FIG. 6.

FIGS. 6 and 7 both illustrate the organization of the step motor 28 comprised of a bottomed, tubular casing 40, a rotor 41 and a stator 42 both housed within the casing 40, and a cover 43 for the casing 40. Provided at the outer periphery of the rotor 41 are a plurality of rectangular teeth 41a. Correspondingly, a plurality of rectangular teeth 42a are provided at the inner periphery of the stator 42. A solenoid 44 is wound around the stator 42. Two stopper pins 45 and 46 are disposed on one surface of the rotor 41 opposite the cover 43 so that the pins 45 and 46 face each other across the axis of rotation of the rotor 41. Formed on the underside of the cover 43 are two circular arc-like interlocking grooves 47 and 48 that locate at corresponding positions to the stopper pins 45 and 46, as shown in FIG. 8. The groove 47 engages with the stopper pin 45 to limit the range of rotation of the step motor 28, and the groove 48 engages with the stopper pin 46. The engagement of the stopper pins 45 and 46 with the grooves 47 and 48 ensures that the axis of rotation of the rotor 41 will not deviate. The groove 48 has a greater round angle than the groove 47 in relation to the center of the cover 43, so that the range of rotation of the step motor 28 is mainly limited by the groove 47. If the rotor 41 of FIG. 7 rotates clockwise, this causes the damping coefficient Dk of the shock absorbers 1, 2, 3, and 4 to increase whereby the resulting damping force becomes harder. On the other hand, if the rotor 41 rotates counterclockwise, this causes the damping coefficient Dk to decrease whereby the resulting damping force becomes softer. Further, if the tooth 41a of the rotor 41 travels to a position facing the tooth 42a of the stator 42, that is, the step motor 28 rotates one step, this allows the damping coefficient Dk to change by one degree. Therefore, if the stopper pin 45 stays at the leftmost end (the first reference position) of the groove 47 in FIG. 8, the damping coefficient Dk is now at the damping coefficient D10 that allows the shock absorbers 1, 2, 3, and 4 to generate a hardest damping force. Conversely, if the stopper pin 45 stays at the rightmost end (the second reference position) of the groove 47 in FIG. 8, the damping coefficient Dk is now at the damping coefficient D1 that allows the shock absorbers 1, 2, 3, and 4 to generate a softest damping force.

Figure 9:
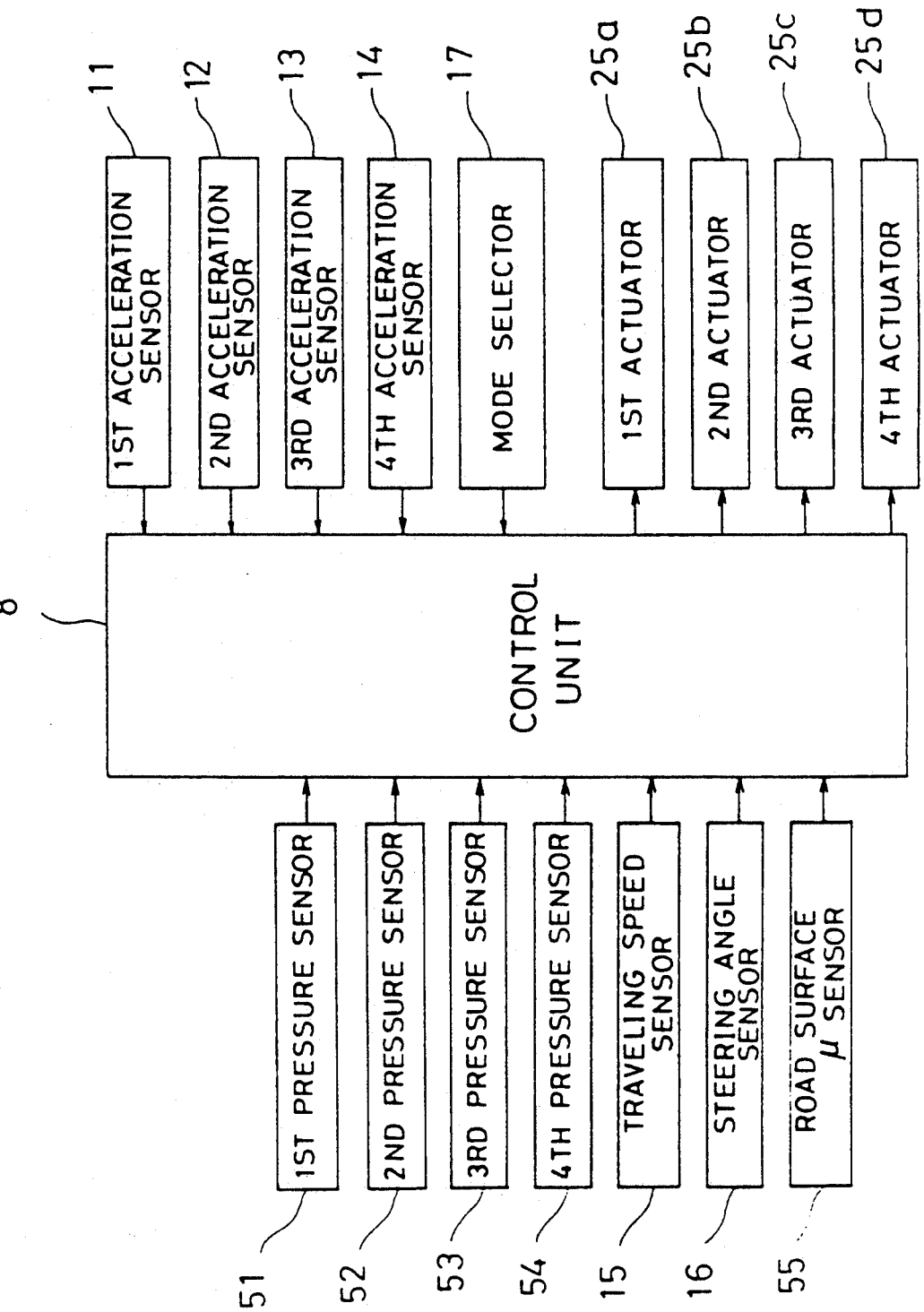
FIG. 9 is a block diagram showing the organization of a control unit of the suspension system of the invention.

Reference is now made to FIG. 9 for the description of the organization of a control unit of the suspension system of the invention. For the LF wheel 5, a first pressure sensor 51, a first acceleration sensor 11, and a first actuator 25a are provided. For the RF wheel (not shown), a second pressure sensor 52, a second acceleration sensor 12, and a second actuator 25b are provided. For the LR wheel 6, a third pressure sensor 53, a third acceleration sensor 13, and a third actuator 25c are provided. For the RR wheel (not shown), a fourth pressure sensor 54, a fourth acceleration sensor 14, and a fourth actuator 25d are provided. The actuators 25a, 25b, 25c, and 25d and the actuator 25 of FIG. 2 are of the same type. The pressure sensors 51, 52, 53, and 54, built in the respective shock absorbers 1, 2, 3, and 4, serve as a damping detection means so that they perform the function of detecting actual damping forces generated by the shock absorbers 1, 2, 3, and 4.

The reference numerals 15, 16, and 17 represent the speed sensor, the steering angle sensor, and the mode selector, respectively. Additionally, a road surface $\mu$ sensor, indicated by the reference numeral 55, is provided which is used to detect the coefficient of friction, $\mu$ of a road surface. The road surface $\mu$ sensor 55 detects the coefficient of friction by a conventional method, for example, by such a method in which the coefficient of friction is detected by the traveling speed and the differentiated value of the traveling speed (i.e., the vehicle body acceleration). Detection signals of the foregoing sensors, switches and like elements are all fed to the control unit 8. The control unit 8 sends out control signals to the first to fourth actuators 25a through 25d. The actuators 25a through 25d operate by such control signals to change and control the damping coefficient Dki where the letter "k" represents the degree of damping coefficient and takes values ranging from one to ten, and the letter "i" identifies the actuators 25a through 25d or the shock absorbers 1 through 4 and takes values ranging from one to four.

Figure 10:
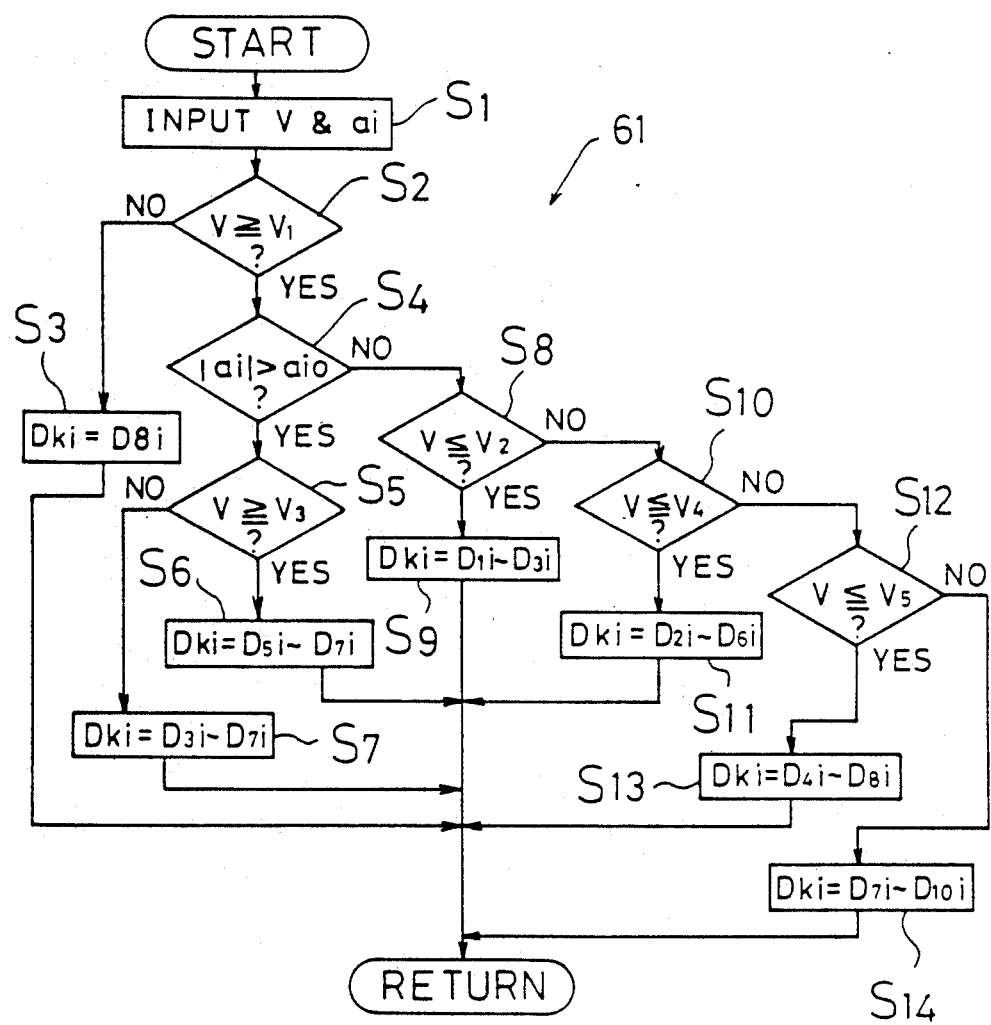
FIG. 10 is a flowchart showing damping coefficient limitation routines.

The following describes how the control unit 8 changes and controls the damping coefficient Dki of the shock absorbers 1, 2, 3, and 4. This change control operation is carried out according to the flowcharts of FIGS. 10 and 11. The flowchart of FIG. 10 shows damping coefficient limitation routines in which the range of selection of the damping coefficient Dki of ten degrees is changed on a limited basis. In other words, out of the ten degrees certain degrees are selected as the range of selection thereby forcing the damping coefficient Dki of the shock absorbers 1, 2, 3, and 4 to change between the selected degrees. The flowchart of FIG. 11, on the other hand, shows basic routines of the change control of the damping coefficient Dki executed at the time when the mode selector 16 is in the position of CONTROL MODE.

SIGNAL of the traveling speed V detected by means of the speed sensor 15, along with SIGNAL of the sprung vertical accelerations ai detected by the acceleration sensors 11 through 14, is first supplied to the control unit 8 (STEP S1 of FIG. 10). STEP S2 checks whether the traveling speed V is greater than the first predetermined traveling speed V1 such a very low speed as 3 km/h. If V<V1 (i.e., the diagnosis is NO), the procedure then advances to STEP S3. Since the traveling speed V indicates a very low speed, the damping coefficient Dki of each shock absorber is fixed at the degree of D8i for harder damping forces to prevent unwanted motion such as damping dive from taking place. Here, since the damping coefficient Dki is fixed at D8i, no basic routines for the change control of the damping coefficient Dki of FIG. 1 are not carried out.

If V>V1 (i.e., YES), this causes the procedure to advance to STEP S4. STEP S4 checks whether the absolute value of the sprung vertical acceleration ai is greater than the predetermined value ai0 (that is, checks whether the automobile is now traveling over a rough road the condition of which is indicated by a value greater than the ai0). If the diagnosis is YES, this causes the procedure to advance to STEP S5 that checks whether the traveling speed V is greater than the third predetermined traveling speed V3 (for example, 50 km/h).

If the diagnosis at STEP S5 is YES, the damping coefficient Dki will be set within the range of from D5i to D7i so that the change control of the damping coefficient Dki can be executed within such a range for relatively hard damping forces, in view of the improvements of traveling stabilization. As a result of this, in the basic routines of FIG. 11, the damping coefficient D5i becomes a lower limit value. The damping coefficient Dki keeps remaining at the degree of D5i even though certain conditions, requiring the damping coefficient Dki now in selection to change to a lesser degree for a softer damping force, are established. The damping coefficient D7i, on the other hand, becomes an upper limit value. The damping coefficient Dki keeps remaining at the degree of D7i even though certain conditions, requiring the Dki now in selection to change to a greater degree for a harder damping force, are established.

If the diagnosis at STEP S5 is NO, this causes the procedure to advance to STEP S7. Since making the improvements of traveling stabilization compatible with the improvements of riding comfort are required, the damping coefficient Dki is set within the range of from D3i to D7i so that it is possible for the damping coefficient Dki to be changed and controlled within the range of from one condition for a relatively soft damping force to the other for a hard damping force. As a result of this, in the basic routines of FIG. 11, the damping coefficient D3i becomes a lower limit value. The damping coefficient Dki keeps remaining at the degree of D3i even though certain conditions, requiring the damping coefficient Dki now in selection to change to a lesser degree for a softer damping force, are established. The damping coefficient D7i, on the other hand, becomes an upper limit value. The damping coefficient Dki keeps remaining at the degree of D7i even though certain conditions, requiring the damping coefficient Dki now in selection to change to a greater degree for a harder damping force, are established.

If the diagnosis at STEP S4 is NO, which means that the automobile is now traveling not over a rough road but over an average condition road, STEP S8 checks whether the traveling speed V is lower than the second predetermined traveling speed V2 (for instance, 30 km/h). If YES is obtained here, the damping coefficient Dki is set within the range of from D1i to D3i so that the change control of the damping coefficient Dki can be executed within such a range for relatively soft damping forces, in view of the improvements of riding comfort. As a result of this, in the basic routines of FIG. 11, the damping coefficient Dki keeps remaining at the degree of D1i even though certain conditions, requiring the damping coefficient Dki now in selection to change to a lesser degree for a softer damping force, are established. The damping coefficient D3i becomes an upper limit value. The damping coefficient Dki keeps remaining at the degree of D3i even though certain conditions, requiring the damping coefficient Dki now in selection to change to a greater degree for a harder damping force, are established.

If STEP S8 results in NO, STEP S10 further checks whether the traveling speed V is lower than the fourth predetermined traveling speed V4 (for example, 60 km/h). If STEP S10 results in YES, this causes the procedure to advance to STEP S11. Since making the improvements of traveling stabilization compatible with the improvements of riding comfort is required, the damping coefficient Dki is set within the range of from D2i to D6i so that it is possible for the damping coefficient Dki to be changed and controlled within the range of from one condition for a relatively soft damping force to the other for a hard damping force. As a result of this, in the basic routines of FIG. 11, the damping coefficient D2i becomes a lower limit value. The damping coefficient Dki keeps remaining at the degree of D2i even though certain conditions, requiring the damping coefficient Dki now in selection to change to a lesser degree for a softer damping force, are established. The damping coefficient D6i, on the other hand, becomes an upper limit value. The damping coefficient Dki keeps remaining at the degree of D6i even though certain conditions, requiring the damping coefficient Dki now in selection to change to a greater degree for a harder damping force, are established.

If, however, STEP S10 gives a diagnosis of NO, this causes the procedure to advance to STEP S12 that checks out whether the traveling speed V is lower than the fifth predetermined traveling speed V5 (for example, 80 km/h). If STEP S12 results in YES, the procedure then advances to STEP S13 where the damping coefficient Dki is set within the range of from D4i to D8i to change and control the damping coefficient Dki suitable for a slightly harder damping force while at the same time improving traveling stabilization together with riding comfort. As a result of this, in the basic routines of FIG. 11, the damping coefficient D4i becomes a lower limit value. The damping coefficient Dki keeps remaining at the degree of D4i even though certain conditions, requiring the damping coefficient Dki now in selection to change to a lesser degree for a softer damping force, are established. The damping coefficient D8i, on the other hand, becomes an upper limit value. The damping coefficient Dki keeps remaining at the degree of D8i even though certain conditions, requiring the damping coefficient Dki to change to a greater degree for a harder damping force, are established.

If the diagnostic at STEP S12 is NO which indicates a high traveling speed, the procedure advances to STEP S14 at which the damping coefficient Dki will be set within the range of from D7i to D10i so as to change and control the damping coefficient Dki within such a range for achieving hard damping forces, in view of the improvements of traveling stabilization. As a result of this, in the basic routines of FIG. 11, the damping coefficient D7i becomes a lower limit value. The damping coefficient Dki keeps remaining at the degree of D7i even though certain conditions, requiring the damping coefficient Dki now in selection to change to a lesser degree for a softer damping force, are established. The damping coefficient Dki keeps remaining at the degree of D10i even though certain conditions, requiring the damping coefficient Dki now in selection to change to a greater degree for a harder damping force, are established.

Figure 11:
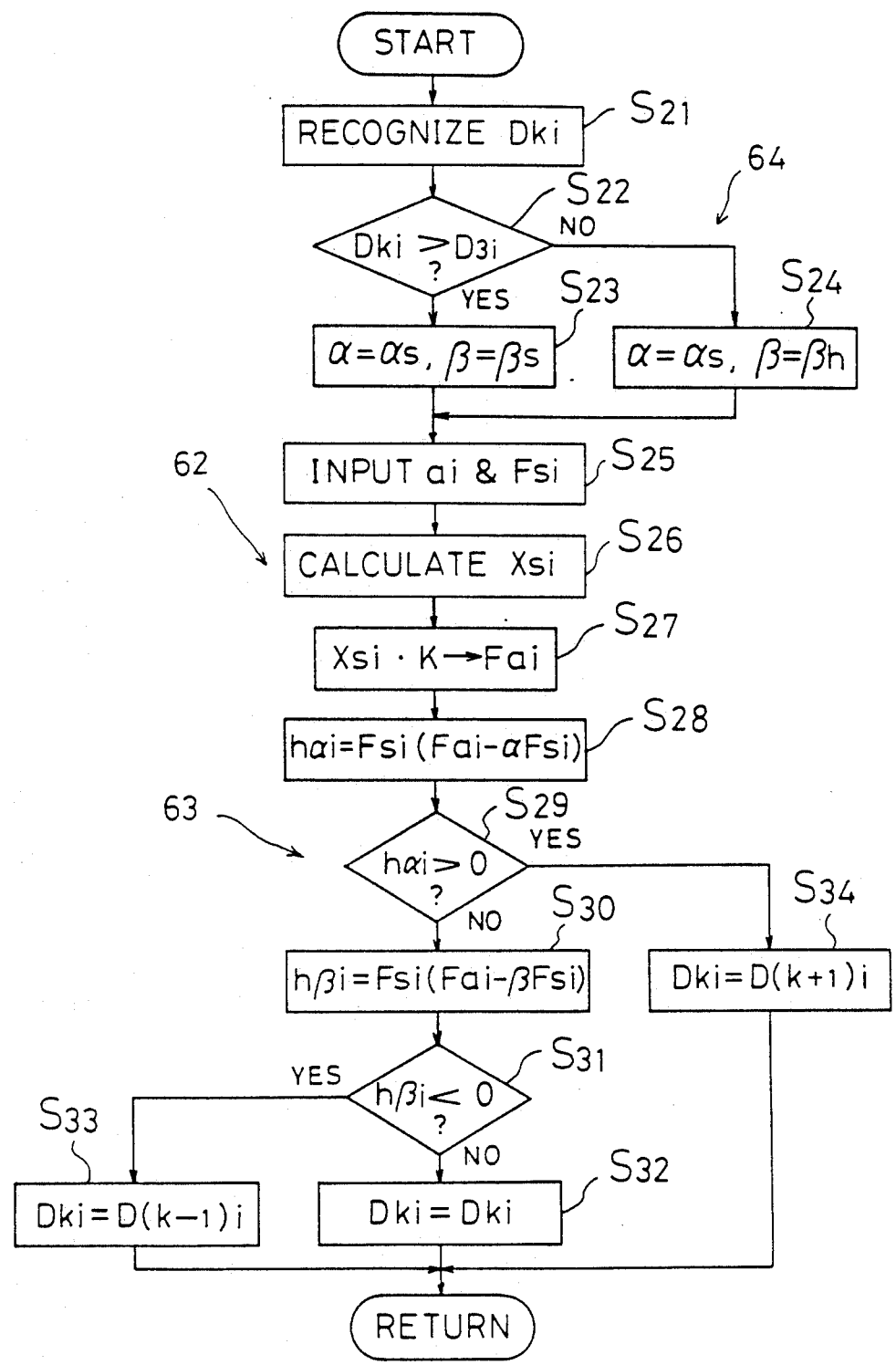
FIG. 11 is a flowchart showing basic routines of the change control of the damping coefficient.

With regard to the above-described basic routines of FIG. 11, a limitation means 61 is provided. The limitation means 61 determines the upper limit damping coefficient Dki as well as the lower limit damping coefficient Dki of each shock absorber according to such traveling conditions as a traveling speed, and further limits the range of selection of the damping coefficient Dki.

In the basic routines of FIG. 11 for the damping coefficient change control, the damping coefficient Dki now in selection of each shock absorber is recognized at STEP S21. STEP S22 checks whether the damping coefficients Dki is greater than the damping coefficient D3i. If STEP S22 results in YES, values, $\alpha s$ and $\beta s$ are assigned for the upper and lower limit thresholds $\alpha$ and $\beta$ respectively at STEP S23. In the case that NO is given, values, $\alpha s$ and $\beta h$ are assigned for the thresholds $\alpha$ and $\beta$ respectively at STEP S24.

With the foregoing thresholds $\alpha$ and $\beta$ set, SIGNAL of the sprung vertical accelerations ai as well as SIGNAL of the actual damping forces Fsi of the shock absorbers 1, 2, 3, and 4 detected by the pressure sensors 1, 2, 3, and 4 is input at STEP S25. Then STEP S26 integrates the acceleration ai to obtain the sprung vertical displacement velocity Xsi (=$\Sigma$ai). At STEP S27 the multiplication of the displacement velocity Xsi times the predetermined constant K (K<0) is carried out to find out an ideal damping force (i.e., the skyhook damper force Fai).

h $\alpha$ i is calculated by the following Formula (1), at STEP S28.

$$h\alpha i = Fsi \cdot (Fai - \alpha \cdot Fsi) \quad (1)$$

Thereafter, STEP S29 checks whether h$\alpha$i is positive or not. If h$\alpha$i is found to be positive, that is, YES is obtained, this supplies the actuators 25a, 25b, 25c, and 25d with control signals at STEP S34, whereby the step motors 28 rotate one step clockwise to achieve the damping coefficient D(K+1)i greater than the previous damping coefficient Dki by one degree, for harder damping forces. If h $\alpha$i is found not to be positive, that is, the diagnosis is NO, this causes the procedure to advance to STEP S30. h$\beta$i is calculated by the following Formula (2).

$$h\beta i = Fsi \cdot (Fai - \beta \cdot Fsi) \quad (2)$$

Thereafter, STEP S31 checks whether h$\beta$i is negative or not. If h$\beta$i is found to be negative, that is, YES is obtained, this supplies the actuators 25a, 25b, 25c, and 25d with control signals at STEP S33, whereby the step motors 28 of the actuators rotate one step counterclockwise to achieve the damping coefficient D(K−1)i lower than the previous damping coefficient Dki by one step, for softer damping forces. If, meanwhile, h$\beta$i is found not to be negative, that is, in the case of NO, this makes no changes to the damping coefficient Dki, in other words, none of the step motors 28 rotate at STEP S32, and the procedure advances to the next cycle with the previous damping coefficient Dki unchanged.

The thresholds $\alpha$ and $\beta$ serve to prevent the damping coefficient Dki from being changed many times, and are set by: $\alpha > 1$; $0 > \beta > 1$.

If Fsi and Fai are the same sign, (Fai−$\alpha$·Fsi) of Formula (1) is likely to become a different sign from Fsi compared to such a case where Fsi is not multiplied by $\alpha$, since $\alpha > 1$. As a result of this, h$\alpha$i is likely to be negative, which hampers the damping coefficient Dki to change to a greater degree for a harder damping force. (Fai−$\beta$·Fsi) of Formula (2) is likely to become the same sign as Fsi compared to such a case where Fsi is not multiplied by $\beta$, since $0 > \beta > 1$. As a result of this, h$\beta$i is likely to be positive, which hampers the damping coefficient Dki to change to a lesser degree for a softer damping force.

Conversely, if Fsi and Fai are different signs, it is unachievable to harmonize the damping force Fsi with the ideal damping force, or the skyhook damper force Fai. In view of this, it is preferable to bring the damping coefficient Dki to around zero, in other words, to change the damping coefficient Dki to a lesser degree suitable for a softer damping force. For the present embodiment, if Fsi and Fai are different signs, both h$\alpha$i and h$\beta$i become negative values. This results in the control unit 8 achieving the damping coefficient D(k−1)i that is lower than the previous damping coefficient Dki by one degree. Therefore, the foregoing requirements are satisfied.

If Fsi and Fai are the same sign, the damping coefficient Dki will find it more difficult to make a transition to a lesser degree for a softer damping force as the lower limit threshold $\beta$ approaches zero. $\beta s$ and $\beta h$ are so set that the relationship of $<\beta h<\beta s<1$ holds. If $\alpha h$ is assigned as the lower limit threshold $\beta$, or the damping coefficient Dki now in selection is lower than the damping coefficient D3i, this hampers the damping coefficient Dki to make a transition to a lesser degree for a softer damping force, compared to when $\beta s$ is assigned as the lower limit threshold $\beta$, or the damping coefficient Dki now in selection is greater than the damping coefficient D3i.

Figure 12:
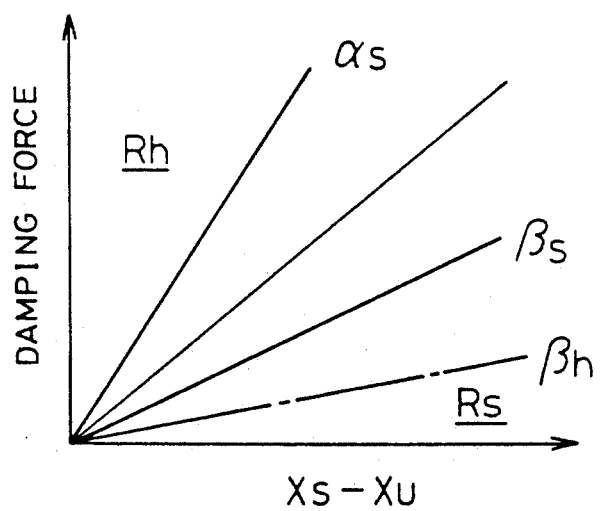
FIG. 12 is a characteristic diagram of the damping coefficient change versus the threshold.

FIG. 12 shows a relation of the change of the damping coefficient Dki versus the threshold wherein Rh indicates a characteristic zone where the damping coefficient Dki is changed to a greater degree for a harder damping force (that is, the damping coefficient Dki is changed to the damping coefficient D(k+1)i greater than the previous damping coefficient Dki by one degree, while on the other hand Rs indicates another characteristic zone where the damping coefficient Dki is changed to a lesser degree for a softer damping force (that is, the damping coefficient Dki is changed to the damping coefficient D(k−1)i lower than the previous damping coefficient Dki by one degree. Defined between the upper limit threshold $\alpha s$ and the lower limit threshold $\beta s$ (or $\beta h$) is a dead band zone where the damping coefficient Dki is not changed. If the lower limit threshold $\beta$ takes a lower value of $\beta h$, this results in less characteristic zone Rs, compared to when a greater value of $\beta s$ is taken for the lower limit threshold $\beta$. Thus, the damping coefficient Dki finds it difficult to make a transition to a lesser degree, the damping coefficient D(k−1)i.

A control means 62 is so configured that the damping coefficient Dki can be changed and controlled to harmonize the actual damping force Fsi with the skyhook damper force Fai at from STEP S25 to STEP S34 of FIG. 11. An inhibition means 63 is provided which inhibits the control means 62 from changing the damping coefficient Dki when the difference between the damping force Fsi and the skyhook damper force Fai falls in the range of the predetermined value (i.e., the dead band zone of FIG. 12) (STEPS S29 to S32). Further, a threshold change means 64 is provided which increases the foregoing predetermined value when the damping coefficient Dki changes to a lesser degree (i.e., to the damping coefficient D(k−1)i) as the damping coefficient Dki now in selection decreases. In other words, the threshold change means 64 reduces the lower limit threshold $\beta$ hamper the damping coefficient Dki to move to a lesser degree (i.e., the damping coefficient D(k−1)i).

As described above, the damping coefficient Dki is changed and controlled so that the damping force Fsi can be made equal to the skyhook damper force Fai that causes no sprung vertical motion. The sprung vertical motion is controlled as effectively as possible. This leads to the improvements of traveling stabilization.

Besides the above advantages, if the difference between the damping force Fsi and the skyhook damper force Fai is within the predetermined value, the foregoing change control of the damping coefficient Dki is brought to a stop, inhibited. The upper limit damping coefficient Dki and the lower limit damping coefficient Dki are determined based on traveling conditions such as a traveling speed, and within such a limited range the damping coefficient Dki is changed so that while improving traveling stabilization as well as riding comfort according to traveling conditions, it is possible to avoid noise produced in switching and oscillation due to the damping coefficient Dki being changed too often. The lower limit threshold $\beta$ of the dead band zone where the change of damping coefficient Dki is prohibited becomes lower when Dki<D3i, compared to when Dki>D3i. This hampers the damping coefficient Dki now in selection to make a transition to a lesser degree (i.e., the damping coefficient D(k−1)i). As a result, the damping coefficient Dki of the shock absorbers 1, 2, 3, and 4 does not require to be changed too often against the input of low external forces, and the occurrence of chattering can be prevented.

In the change control of the damping coefficient of FIG. 13, the thresholds $\alpha$ and $\beta$ of the dead band zone are set according to the damping coefficient Dki now in selection of the shock absorbers 1, 2, 3, and 4.

Figure 14:
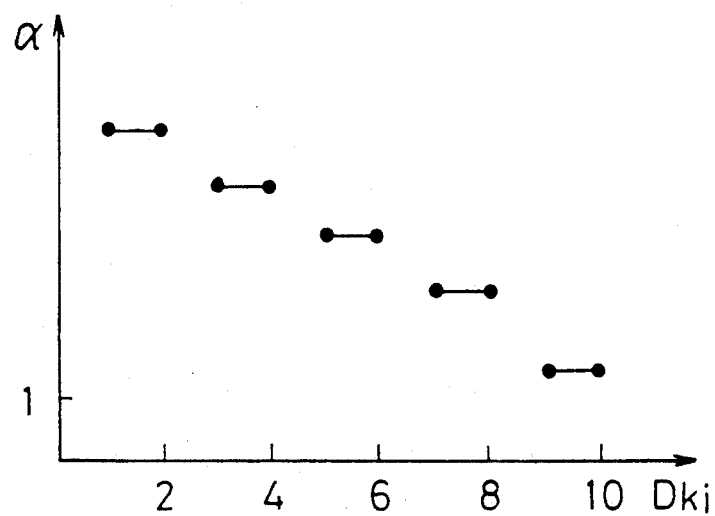
FIG. 14 is a view showing a map used for setting the upper limit threshold, $\alpha$.

As shown in the flowchart of FIG. 13, the damping coefficient Dki now in selection is recognized at STEP S31. At STEP S32, the upper limit threshold $\alpha$ of the dead band zone, corresponding to the foregoing recognized damping coefficient Dki, is read out from a map stored in advance (FIG. 14). In the map, the upper limit threshold $\alpha$ is not less than 1, and is set to gradually decrease as the damping coefficient Dki increases every two degrees.

Figure 15:
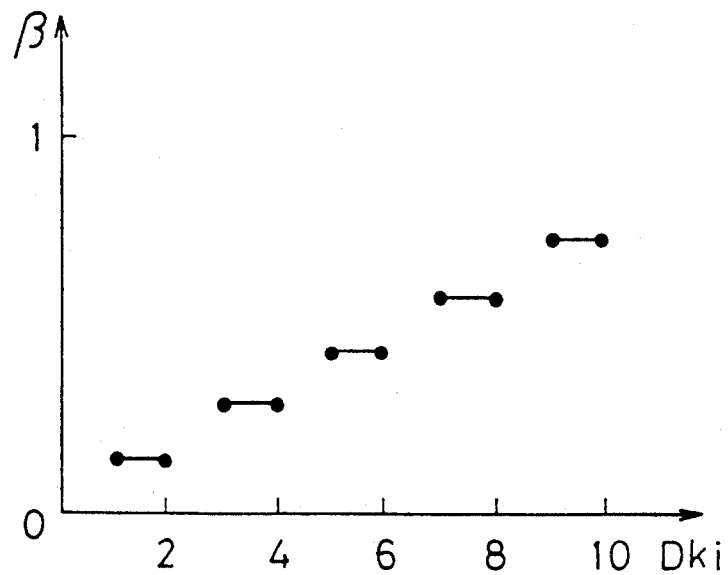
FIG. 15 is a view showing a map used for setting the lower limit threshold, $\beta$.

At STEP S33, the lower limit threshold $\beta$ of the dead band zone, corresponding to the recognized damping coefficient Dki, is read out from a map stored in advance (FIG. 15). In the map, the lower limit threshold $\beta$ stays between zero and one, and is set to gradually increase as the damping coefficient Dki increases every two degrees. A threshold change means 71 is provided which changes the upper and lower limit thresholds $\alpha$ and $\beta$ of the dead band zone according to the magnitude of the damping coefficient Dki, which is currently being selected or now in selection, of the shock absorber.

Thereafter, the procedure shifts to STEP S25 and the subsequent STEPS of FIG. 11. The damping coefficient Dki is so changed in order that the damping force Fsi becomes equal to the skyhook damper Fai, and at the same time the damping coefficient Dki is prevented from changing to a lesser or greater degree if the difference between the actual damping force Fsi and the skyhook damper force Fai falls in the range of the dead band zone.

The lower limit threshold $\beta$ of the dead band zone is set to gradually increase as the damping coefficient Dki increases every two degrees. In other words, the lower limit threshold $\beta$ decreases with the damping coefficient Dki. Accordingly, the degree of ease for the damping coefficient Dki to make a transition to a lesser degree for a softer damping force can appropriately be changed according to the magnitude of the damping coefficient Dki now in selection and therefore according to the magnitude of working external forces. The occurrence of chattering can effectively be prevented.

Additionally, the upper limit threshold $\alpha$ of the dead band zone is set to gradually decrease as the damping coefficient Dki increases. When a rapid, severe external force works on the automobile, such as when traveling over a bump on the road, the damping coefficient Dki can make a swift change to a lesser degree for a harder damping force with suffering little ill effect due to the presence of the dead band zone. Because of this, each one of the shock absorbers 1, 2, 3, and 4 generates a damping force approximately equal to the skyhook damper force Fai thereby exhibiting sufficient damping effects. Thus, riding comfort and traveling stabilization can be improved.

Figure 16:
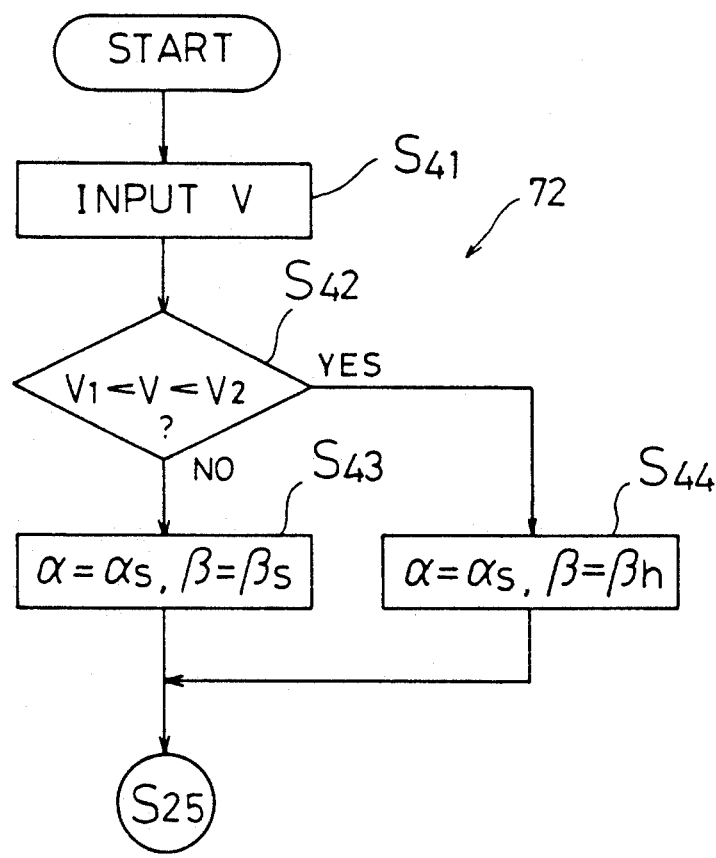
FIG. 16 is a part of a flowchart showing in another modified example basic routines of the change control of the damping coefficient.

Now reference is made to FIG. 16. As the change control described above, if the upper limit damping coefficient Dki and the lower limit damping coefficient Dki change either to lower ones when the automobile travels at a low speed, or to greater ones when traveling at a high speed, the lower limit threshold $\beta$ of the dead band zone is changed according to the traveling speed, since the moment when the automobile travels at a low speed corresponds to the moment when the damping coefficient Dki becomes lower.

A threshold change means 72 is supplied with SIGNAL of the traveling speed V at STEP S41 (FIG. 16). Then STEP S42 checks whether the relationships of the first predetermined traveling speed V1 (for example, 3 km/h)<the traveling speed V<the second predetermined traveling speed V2 (for example, 30 km/h) holds. If STEP S42 answers NO, values $\alpha$s and $\beta$s are set as the thresholds $\alpha$ and $\beta$, respectively, at STEP S43. If STEP S42 answers YES, values $\alpha$s and $\beta$h are set as the thresholds $\alpha$ and $\beta$, respectively, at STEP S44. Here, these values are so set that the relationships of $0<\beta h<\beta s<1$ holds. Through STEP S41 to STEP S44, the lower limit threshold $\beta$ of the dead band zone at the time when the automobile travels at a low speed is designed to take a lower value, compared to all other traveling speeds so that the damping coefficient Dki is hampered to make a transition to a lesser degree (that is, the damping coefficient D(k−1)i), which is performed by the threshold change means 72. Thereafter, the procedure shifts to STEP S25 and the subsequent STEPS of FIG. 11.

The invention claimed is:
1. A suspension system for automobiles, said suspension system comprising:

a shock absorber of multi-degree variable-damping-coefficient type which is disposed between a sprung element and an unsprung element;

damping force detection means which detects an actual damping force generated by said shock absorber;

control means which is supplied with a signal from said damping force detection means and then changes and controls a damping coefficient of said shock absorber to harmonize the damping force generated by said shock absorber with a target damping force that causes no sprung vertical motion;

inhibition means which inhibits said control means from performing the function of changing and controlling the damping coefficient of said shock absorber if the difference between the damping force of said shock absorber and the target damping force falls in the range of a predetermined value; and threshold change means which changes the predetermined value according to the magnitude of the damping coefficient, which is currently being selected, of said shock absorber.

2. The suspension system of claim 1, wherein said threshold change means is so designed that as the magnitude of the damping coefficient, which is currently being selected, of said shock absorber increases, the predetermined value when the damping coefficient changes to a greater degree decreases thereby facilitating the change of the damping coefficient, which is currently being selected, to a greater degree.

3. The suspension system of claim 1, wherein said threshold change means is so designed that as the magnitude of the damping coefficient, which is currently being selected, of said shock absorber decreases, the predetermined value when the damping coefficients changes to a lesser degree increases thereby hampering the change of the damping coefficient, which is currently being selected, to a lesser degree.

4. The suspension system of claim 1, wherein said shock absorber includes:

a cylinder;

a piston unit having a portion defining an orifice, the piston unit being fit and inserted into said cylinder; and an actuator that can gradually throttle said orifice at plural degrees.

5. The suspension system of claim 4, wherein said actuator includes:

a shaft, rotatably mounted within said piston unit;

a step motor that rotates said shaft a predetermined angle at a time;

a first orifice plate, mounted at the lower end of said shaft to rotate together with said shaft and provided with portions defining a plurality of circular openings that are formed at predetermined intervals in the circumferential direction of said first orifice plate; and a second orifice plate, mounted within said orifice and provided with a portion defining a crescent-like opening in a facing relationship with said plurality of circular openings of said first orifice plate;

whereby said step motor operates to rotate said first orifice plate, which results in changing the number of said plurality of circular openings facing said crescent-like opening to gradually throttle said orifice at plural degrees.

6. The suspension system of claim 5, wherein said step motor includes:

a tubular casing with a bottom;

a rotor housed within said casing;

a stator housed within said casing; and a cover for said casing; whereby:

one side face of said stator opposite said cover is provided with two projecting stopper pins that face each other across the axis of rotation of said stator;

said cover is provided with two circular arc-like interlocking grooves that interlock with said stopper pins respectively so as to support said rotor without causing the deviation of the axis of rotation of said rotor as well as to limit the range of rotation of said rotor.

7. The suspension system of claim 1, further including:

traveling condition detection means which detects a traveling condition; and limitation means that selects damping coefficients from among damping coefficients available for said shock absorber for limiting the range of selection, based on the traveling condition detected by said traveling condition means wherein the number of the selected damping coefficients is lower than that of the available damping coefficients;

whereby said control means is designed to select a single damping coefficient from among the damping coefficients selected by said limitation means.

8. The suspension system of claim 7, wherein said traveling condition detection means is employed to detect a traveling speed as a traveling condition, and said limitation means selects greater damping coefficients as the range of selection as the traveling speed increases.

9. The suspension system of claim 8, wherein said threshold change means is designed to increase said predetermined value when the damping coefficient of said shock absorber changes to a lesser degree thereby hampering the change of the damping coefficient to a lesser degree.

10. The suspension system of claim 7, wherein said traveling condition detection means is employed to detect a sprung vertical acceleration as a traveling condition, and said limitation means selects greater, plural damping coefficients as the range of selection as the sprung vertical acceleration increases.

* * * * *